United States Patent [19]
Stauffer
[11] 3,846,830
[45] Nov. 5, 1974

[54] RECORDING AND PLAYBACK APPARATUS

[75] Inventor: Norman L. Stauffer, Englewood, Colo.
[73] Assignee: Honeywell Inc., Minneapolis, Minn.

[22] Filed: Sept. 26, 1973
[21] Appl. No.: 400,710

Related U.S. Application Data

[63] Continuation of Ser. No. 191,177, Oct. 21, 1971, abandoned.

[52] U.S. Cl. .................... 360/56
[51] Int. Cl. .................... G11b 5/78
[58] Field of Search ....... 346/74 EB, 74 ES, 74 MP, 346/74 M, 74 TP; 178/6.6 TP; 179/100.2 A; 360/56

[56] References Cited

UNITED STATES PATENTS 3,683,382 8/1972 Ballinger .................... 346/74 M

*Primary Examiner*—James W. Moffitt
*Attorney, Agent, or Firm*—Arthur H. Swanson; Lockwood D. Burton; Mitchell J. Halista

[57] ABSTRACT

Recording and playback apparatus for recording visible representations on a recording medium having a uniform distribution of capsules containing a suspension of reflective, force-field responsive particles. A first recording means is arranged to direct an alternating magnetic field into the medium to selectively align the particles to produce a recorded visible representation while the aligned particles exhibit a substantially zero net remanent magnetic field external to the medium. A second recording means is arranged to direct a unidirectional magnetic field into the medium to selectively align the particles to produce a visible recorded representation while the aligned particles exhibit a net remanent magnetic field external to the medium. A magnetic playback head is traversed across the recording medium to detect the net remanent magnetic field indicative of the recording produced by the second recording means.

10 Claims, 5 Drawing Figures

INVENTOR.
NORMAN L. STAUFFER
BY
ATTORNEY

INVENTOR.
NORMAN L. STAUFFER
BY
ATTORNEY

RECORDING AND PLAYBACK APPARATUS

This is a continuation of application Ser. No. 191,177, filed Oct. 21, 1971, now abandoned.

FIELD OF THE INVENTION

The present invention relates to recording and playback apparatus. More specifically the present invention is directed to a magnetic and playback apparatus for concurrently recording magnetic and optical representations on a magnetic recording medium.

SUMMARY OF THE INVENTION

An object of the present invention is to provide an improved recording and reproducing apparatus.

Another object of the present invention is to provide an improved magnetic recording and reproducing apparatus.

Still another object of the present invention is to provide an improved recording apparatus for recording optically visible representations on a recording medium which representations exhibit an externally detectable field.

A further object of the present invention is to provide a novel magnetic recording apparatus for recording magnetically invisible and optically visible representations on a magnetic recording medium.

A still further object of the present invention is to provide an improved playback apparatus for sensing optically visible magnetic recordings.

In accomplishing these and other objects, there has been provided, in accordance with the present invention, a recording and playback apparatus for recording on a force field responsive recording medium having selectively alignable particles using a first recording means producing a unidirectional force field and second recording means producing an alternating force field. Representations recorded by the first and second recording means are optically visible and a force field responsive playback means is provided to respond to the recordings from the first recording means while the recordings from the second recording means are invisible to the playback means.

BRIEF DESCRIPTION OF THE DRAWINGS

A better understanding of the present invention may be had when the following detailed description is read in connection with the accompanying drawings, in which.

DETAILED DESCRIPTION

Figures 1, 2, 3:
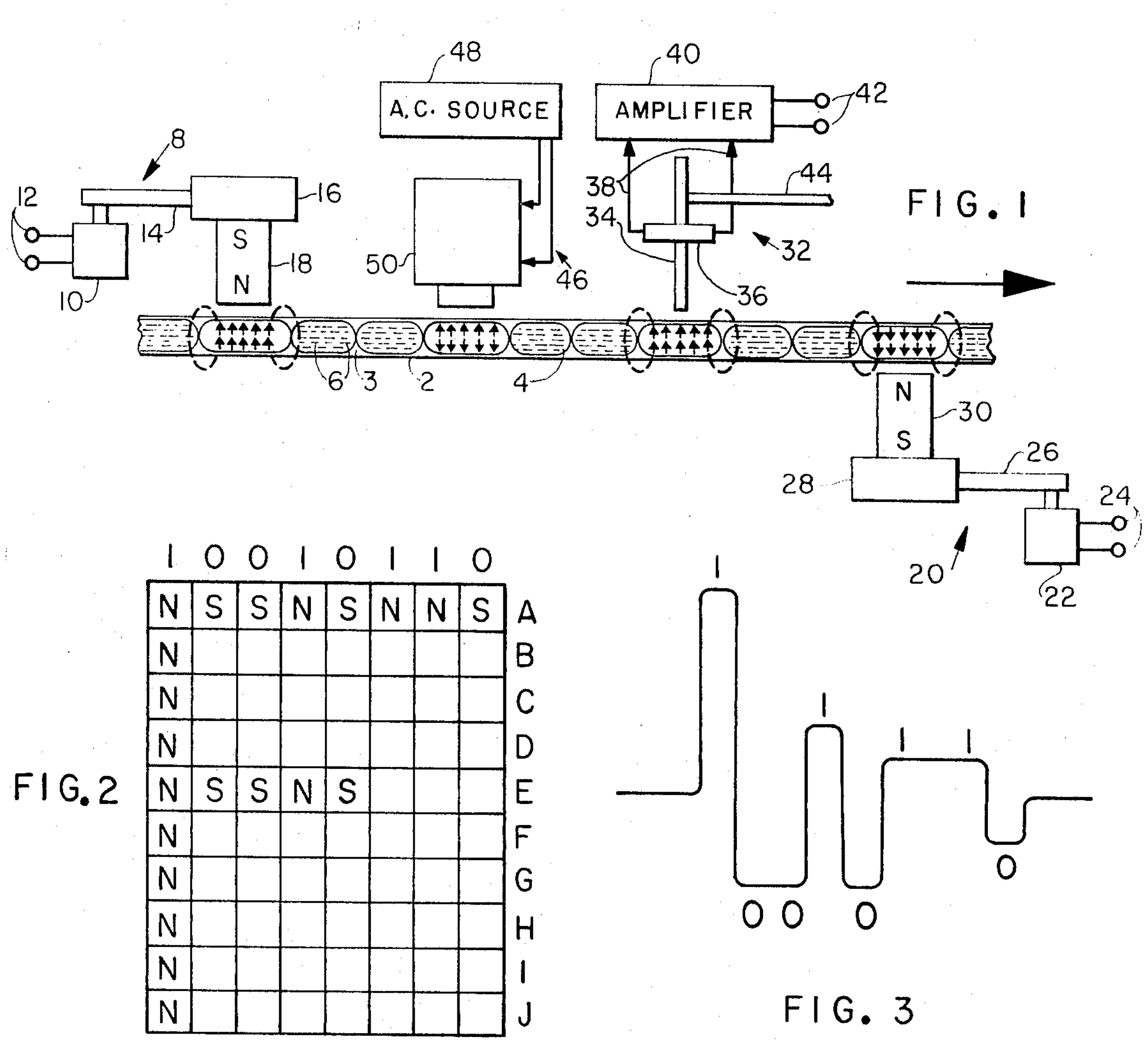
FIG. 1 is a pictorial diagram of a recording system embodying the present invention.
FIG. 2 is a pictorial illustration of a magnetically recorded character using the principles of the present invention.
FIG. 3 is a composite playback signal of the recorded character shown in FIG. 2.

Referring to FIG. 1 in more detail, there is shown a recording medium 2 including a transparent web member 3 having liquid filled capsules 4 uniformly distributed therein. The capsules 4 are each arranged to contain a suspension of force field responsive particles 6 in the form of flake-like and highly reflective particles composed of a suitable material, e.g., nickel. The particles 6 are prealigned during the manufacturing of the recording medium 2 to have their faces parallel to the plane of the recording medium 2 whereby a uniform reflecting surface within the medium 2 with respect to incident light is produced to give the recording medium 2 a uniform appearance. Such a recording medium is shown and claimed in U.S. Pat. No. 3,683,382. The recording medium 2 is driven in the direction shown by the arrow in FIG. 1 by any suitable transport means (not shown) past recording and playback means as described hereinafter.

A first recording means 8 is arranged to produce a unidirectional force field, e.g., magnetic, within the recording medium to selectively align the faces of the magnetically responsive particles 6 perpendicular to the plane of the recording medium 2 whereby incident light is absorbed by internal reflection within the recording medium 2 in the area of the selectively aligned particles. Thus, a contrasting trace is produced on the recording medium corresponding to the area of the selectively aligned particles.

While the following discussion and the accompanying drawings are directed to an embodiment of the invention using magnetic recording and playback devices, it should be noted that the particles 6 are responsive to other force fields, e.g., electrostatic.

The recording means 8 may include a suitable galvanometer drive means 10 arranged to be energized by an input signal applied to a pair of input terminals 12. The galvanometer drive means 10 is effective to move an arm 14 carrying a support means 16 for a permanent magnet recording means 18. The permanent magnet recording means 18 is positioned on the support means 16 to present a predetermined magnetic pole to the recording medium 2. The magnetic field from the permanent magnet 18 is effective to produce a magnetic alignment of the particles 6 confined to the area of the adjacent magnetic pole of the permanent magnet 18. This alignment of the particles 6 in the area of the recording magnetic pole of the permanent magnet 18 is retained after the recording medium 2 is moved in the direction of the arrow away from the permanent magnet recording means 18. Further, an externally detectable magnetic field is associated with the realigned particle 6 as a remanent net magnetic field.

A second magnetic recording means 20 may be proveded either on the same side of the recording medium 2 as the first recording means 8 or on the other side of the recording medium 2 from the first recording means 8. The second recording means 20 may, also, include a galvanometer drive means 22 energized by an input signal applied to a second pair of input terminals 24 and arranged to drive an arm 26 carrying a support means 28 and a permanent magnet 30 attached to the support means 28. The second recording means 20, is, in a manner similar to the first recording means 8, arranged to selectively align the particles 6 in the recording medium 2 which particles maintain a remanent magnetic field after the recording medium 2 is withdrawn from the second recording means 20. In order to differentiate between the external magnetic field produced by the first and second recording means 8 and 20, the remanent magnetic field is arranged to have a first polarity for a first recording trace and a second polarity for a second recording trace. Thus, the first and second recording means 8 and 20 are each effective to produce a contrasting trace on the recording medium 2 which is visible from either side of the recording medium 2 and maintains an externally detectable magnetic field having a magnetic polarity as determined by the orientation of the recording magnet.

A magnetic pickup head 32 for sensing the external magnetic fields of the recorded traces has a conventional flux reading head structure including a core means 34, an energized Hall-plate 36 and output leads 38 from the Hall-plate 36. The output signal of the Hall-plate 36 representing a detected magnetic field is applied to an amplifier 40 which, in turn, is effective to produce an output signal on a pair of output terminals 42 of the amplifier 40. The head 32 may be supported on a support means shown in part as a support arm 44, above the magnetic recording medium 2 and spaced therefrom at a distance sufficient to allow the aforesaid remanent magnetic fields from the recording trace to produce an output signal from the magnetic head 32. In order to detect a remnant magnetic field from a recording trace at any point across the width of the recording medium 2, the magnetic reproducing head 32 either may be linearly swept across the recording medium 2 or may comprise a core structure having a nonmagnetic gap extending across the recording medium 2, i.e., transverse to the direction of motion of the recording medium 2.

A third recording means 46 is supported in an operative relationship with the recording medium 2 and is energized either continuously or selectively by a source of alternating current 48. The third recording means 46 may include a solenoid coil 50. The alternating magnetic field produced by the third recording means 46 is effective to orient the particles 6 to produce a contrasting visible trace on the recording medium 2 as in the case of the first and second recording means 8 and 20. However, since the magnetic field rapidly alternates in polarity, it is not productive of a net remnant magnetic field in the area of the recording trace produced by the third recording means 46. Thus, while the particles 6 may each exhibit a magnetic field from the alignment by the third recording means 46, the net magnetic field external to the recording medium 2 is substantially eliminated by the dual orientation of the particles 6 by the applied alternating magnetic field. Accordingly, the visible recording trace produced by the third recording means 46 does not produce an output signal from the playback head 32 when the head 32 is moved thereacross. Thus, the recording trace from the third recording means 46 may be used to produce grid lines on the recording medium 2 which are a visible recording but are invisible to the playback head 32.

In FIG. 2 there is shown a pictorial representation of a recording of an alphanumeric character, i.e., the character "F", on the type of recording medium 2 shown in FIG. 1. This character is recorded by an assembly of recording elements, as described hereinafter, arranged to produce a plurality of adjacent visible magnetic spots on the recording medium as previously described for recording means 8 and 20. Using the illustration of FIG. 2, the recording elements are ten adjacent recording elements, identified as elements A to J, for producing separate corresponding magnetic spots along a recording line on the recording medium 2. As previously described, these recorded magnetic spots are visible because of a reorientation of the encapsulated magnetic particles 6 in the recording medium 2 to produce a contrast with the unrecorded surface of the recording medium 2. Further, the recorded spots will exhibit a magnetic field external to the surface of the recording medium 2 as discussed with respect to the recording means 8 and 20. The magnetic field from each of the recorded spots will have one of two magnetic polarities depending on the polarity of the recording magnetic field. By inducing a relative motion between the magnetic recording elements A to J and the magnetic recording medium 2, the recording line defined by the elements A to J is progressively moved across the surface of the recording medium which can be in the form of a tape, sheet, etc. Thus, for example, the recording elements A to J can be moved by a typewriter-type mechanism (not shown) wherein either the recording elements A to J are stepped across the recording medium or the recording medium is progressively moved past the recording elements. A character as shown in FIG. 2 is defined by eight positions of the recording elements A to J to form a matrix of 8 × 10 incremental recording areas with the character being defined by a selection of the recording areas within this matrix. In other words, at each location of the incremental recording areas within the matrix, a recording element from one of the recording elements A to J can be selected and a selected polarity of the recording magnetic field applied thereby to the coresponding incremental recording area. The polarity of the recording magnetic field is selected according to a predetermined binary code which is effective to define the character being recorded. Thus, as illustrated in FIG. 2, the character "F" is defined by the binary character 10010110. In this exemplary system, the binary character 1 is used to select a recording magnetic field having a so-called "North" polarity while the binary character 0 is used to select a recording magnetic field having a so-called "South" polarity. Accordingly, in recording each selected character, the recording elements A to J are selected along one axis of the matrix while the polarity of the recording magnetic field for each of the aforesaid eight positions of the recording elements is selected along the other axis of the matrix.

A playback magnetic head, not shown, may be arranged to read the external magnetic field exhibited by the recorded characters (which are visible characters) by inducing a relative motion between the playback head and the recording medium 2 to sweep the playback head across the recorded characters. The playback head has a unitary construction similar to that described above for the playback head 32 in FIG. 1 except that its magnetic gap extends across one axis of the entire recorded character along the recording line in place of the individual recording elements A to J. Thus, the playback head is effective to respond to the magnetic field from all of the magnetic spots recorded along a recording line at each recording position of the recording elements A to J and the amplitude and polarity of its output signal is dependent on the number and plurality of magnetic spots recorded at each recording position, respectively. In FIG. 3, there is shown an output signal from such a playback head corresponding to the character "F" as recorded in the pictorial illustration of FIG. 2. Thus, it may be seen that the polarity of the output signal from the playback head is a reproduction of the binary code identifying the recorded character while the amplitude characteristics of the reproduced signal further identifies the recorded character.

Figure 4:
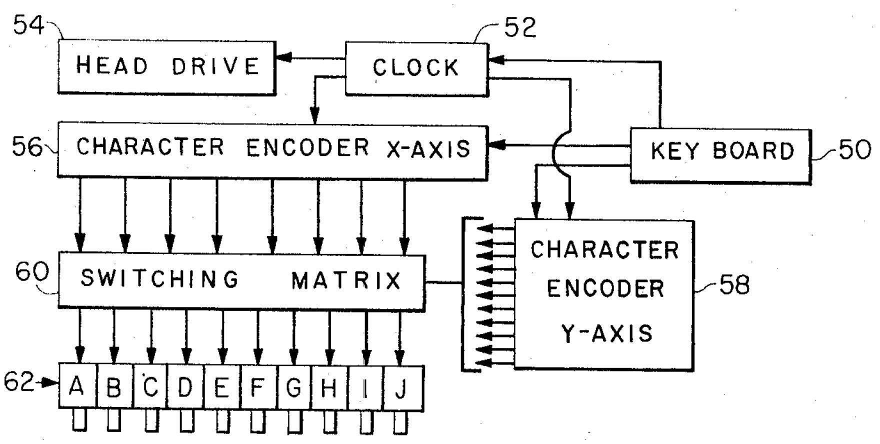
FIG. 4 is a block diagram of a recording system suitable for magnetically recording characters of the type shown in FIG. 2.

In FIG. 4, there is shown a block diagram of a suitable logic circuit for recording the aforesaid characters as illustrated in FIG. 2. As shown in FIG. 4, a keyboard 50 operated by an operator to select the characters to be recorded on the recording medium 2 is arranged to energize related circuit elements in response to the depression of each key on the keyboard 50. A clock means 52 is actuated by each of the keys on the keyboard 50 to produce a series of clock signals for each character on separate output lines. A first series of clock signals is applied to a drive means for inducing relative motion between the recording elements A to J and the recording medium 2, e.g., a head drive means 54. Thus, the head drive means 54 is driven through the eight positions corresponding to the matrix of a character to be printed as shown in FIG 2 for each character selected from the keyboard 50. Further, the keyboard 50 is arranged to apply an energizing signal for each character selected to an X-axis character encoder 56 controlling the X-axis of the character matrix shown in FIG. 2. Concurrently, the keyboard 50 applies an energizing signal to a Y-axis character encoder 58 for selecting the polarity of the magnetic field produced by the magnetic recording elements A to J along each position of the magnetic recording head assembly. A second output signal from the clock means 52 is applied to the X-axis encoder means 56 and to the Y-axis encoder means 58 to synchronize the operation of the recording elements A to J for each position of the recording head with the head drive means 54. The output signals of the X and Y encoders 56 and 58 are applied to respective sides of switching matrix 60 to produce an energizing signal for each of the recording elements A to J forming a recording assembly 62.

Figure 5:
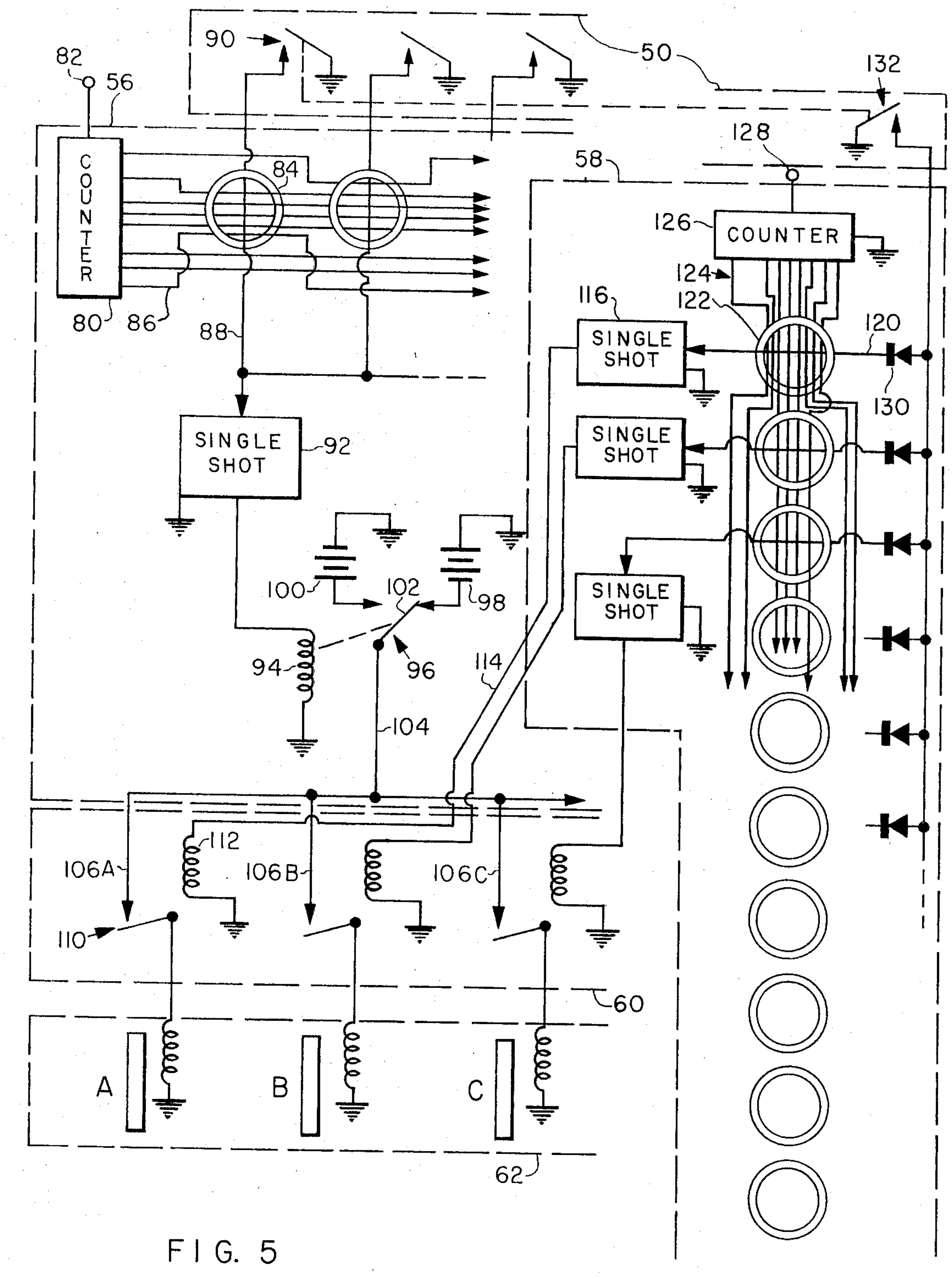
FIG. 5 is a detailed circuit diagram of an example of a circuit suitable for use in the block diagram shown in FIG. 4.

In FIG. 5, there is shown a detailed representation of an example of the circuits suitable for use in the logic system shown in FIG. 4. A first counter 80 in the X-axis encoder 56 has an input terminal 82 arranged to be connected to a source of clock pulses. The counter 80 is effective to provide eight separate output signals from eight respective counter stages therein. Each of the counter output signals are applied to a separate output line. The counter output lines are selectively threaded through a switchable magnetic core in a manner well known in the art as shown in the U.S. Pat. No. 3,351,911 of Harper et al. The selective threading of the output lines from the counter 80 through a core is effective to switch the core in response to a counter output signal of a line is threaded through the core and to maintain an unswitched state if a counter energized line bypasses a core.

Using the example of the character "F" shown in FIG. 2 and a printing operation from left to right, a core 84 is arranged in a coded relationship with the output lines from the counter 80. Thus, a first output line starting from the bottom of the counter block 80 as viewed in FIG. 5 corresponds to the left most column of the character matrix shown in FIG. 2. For purposes of this discussion, the generation of a South polarity magnetic spot on the recording medium 2 is achieved by bypassing the core 84. Thus, the first line 86 is arranged to pass through the core 84. Accordingly, during the first count of the counter 80 in response to the clock signals applied to clock input terminal 82, the core 84 is switched from a prior unswitched state. A sense line 88 is threaded through the core 84 and is connected at one end to a switch means 90 in the keyboard 50. The switch means 90 to connect the sense line 88 to a circuit ground will have been actuated by an operator to select the character "F" for recording on the recording medium 2. The other end of the sense line 88 is connected to the input of a single shot, or multivibrator, circuit 92. Thus, an output signal on the sense line 88 derived from the aforesaid switching of the core 84 is applied to the signal shot 92 to trigger an output signal therefrom.

The output signal from the signal shot 92 is applied to a relay coil 94 to operate an associated single pole, double throw switch means 96. The switch means 96 is normally in a position to complete a circuit from a movable contact 102 and one end of a first DC source 98 while the other end of the first DC source 98 is connected to the circuit ground. The normally open fixed contact side of the switch means 96 is connected to one side of a second DC source 100 having its other end, also, connected to ground. The movable switch contact 102 of the switch means 96 is connected to an output line 104. The output line 104, in turn, is connected to a plurality of output lines from the X-axis character encoder 56 to the switching matrix 60. Each of the output lines from the X-axis character encoder 56 are connected to a switch contact of respective ones of a plurality of switches in the switching matrix 60. Thus, a switch contact of a first switch means 110 in the switching matrix 60 is connected to the first output line 106A.

The switches in the switching matrix 60 are each operated by respective output signals from the Y-axis encoder 58. Thus, the first switch means 110 is operated by a first switch coil 112, which is connected to a first output line 114 from the Y-axis character encoder 58. Specifically, the output line 114 is connected to the output of a first single shot, or multivibrator, 116. The single shot 116 is actuated by a core output signal on a sense line 120 threading a first core in the Y-axis character encoder 58. The Y-axis character encoder 58 is arranged to have a plurality of cores threaded in a coded configuration using the technique previously discussed for the cores in the X-axis character encoder 56. The cores in the Y-axis character encoder are arranged in groups with each group having ten cores. The ten cores correspond to the ten rows A to J of the exemplary character matrix shown in FIG. 2. A plurality of core drive wires 124 are each energized by a corresponding counter stage in a counter 126 connected to a clock input terminal 128. The clock 52 is connected to the clock input terminals 82 and 128 to synchronize the operation of the counters 80 and 126. One end of the sense line 120 is connected to the single shot 116 while the other end of the sense wire 120 is connected through a diode isolating means 130 to a switch means 132 in the keyboard. The switch means 132 is arranged to be concurrently operated with the switch means 90, previously discussed, during the selection of the character "F" on the keyboard 50.

The operation of the Y-axis encoder 58 is arranged to select a combination of the recording elements A to J for each of the vertical columns of the character matrix shown in FIG. 2. Thus, for the example of the letter "F," the first vertical column on the left-hand side would be recorded by a selection of all of the recording elements. Concurrently, the X-axis encoder 56 will have been actuated to select a "North" polarity for the magnetic recording field from these recording elements. Specifically, a direct current signal from the second direct current source 100 is applied to the solenoid coils associated with all of core elements forming the first recording line. Concurrently, assuming that the counter 126 in the Y-axis encoder 58 produces a sequence of output signals starting with the first right-hand counter output line, the illustrated cores in the Y-axis encoder 58 are arranged to select all of the recording elements A to J since the output signal on the last output line from the counter 126 passes through all of the cores in the "F" character core group in the Y-axis encoder 58. Finally, on the last, or extreme left-hand output line of the counter 126 which passes only through the first core 122, the counter output signal is applied to select, i.e., switch, only the first core 122 to energize the first recording element "A" while a suitable magnetic polarity is concurrently selected by the X-axis encoder 56 under the control of the synchronizing clock output signals from the clock means 52. It should be noted that the foregoing recording operation of the entire "F" character occurs during the time that the operator has depressed the "F" character key on the keyboard 50 by providing a suitable frequency for the clock signals. Further, for purposes of simplifying the circuitry shown in FIG. 5, the core windings and signal sources for restoring the switched cores to their original state after each switching operation have been omitted. Thus, since the above-described read-out technique of the cores in the X-axis and Y-axis encoders 56 and 58 is a destructive process, the switched cores must be restored to their original state in order to provide an output signal on their respective sense lines for the next switching operation. If a non-destructive core readout technique is used, the restoration circuits and restoration operation of the switched cores to their original state can be omitted. Additional circuitry for moving the recording elements A to J without printing between characters and to an initial or "home" position may be provided by actuating the head drive means 54 from a space key and a return key, respectively, on the keyboard 50.

Accordingly, it may be seen that there has been provided, in accordance with the present invention, an improved recording and playback apparatus for magnetically recording and detecting visible characters on a magnetic recording medium with each character exhibiting an externally detectable magnetic field and for recording other visible representations which are invisible to the playback means for the magnetically detectable characters.

The embodiments of the invention in which an exclusive property or privilege is claimed are defined as follows:

1. A recording apparatus for recording on a recording medium having a suspension of force field responsive and selectively alignable particles therein comprising:

first means for producing a confined force field perpendicular to a recording surface of said recording medium and within said suspension of particles, means for selectively energizing said first means to selectively produce an alternating force field as said confined force field to align said particles therewith, second means for producing a second confined force field perpendicular to the recording surface of said recording medium and within said suspension of particles, said second means being spaced from said first means along said recording medium, and, second means for selectively actuating said second means for producing to selectively produce a unidirectional force field as said second confined force field to align said particles therewith, said particles exhibiting a net remanent field in response to said unidirectional force field and a substantially zero net remanent field in response to said alternating force field.

2. A recording apparatus as set forth in claim 1 wherein said first-mentioned and said second-mentioned force field is a magnetic field.

3. A recording apparatus as set forth in claim 1 wherein said second means for producing a second confined force field includes means for selectively producing said second confined force field in a first and a second direction with respect to said recording medium and said second means for selectively actuating includes means for selecting said first and said second direction.

4. A recording apparatus as set forth in claim 1 wherein said second means for producing includes a first force field producing means located on the same side as the recording medium as said first means for producing a confined force field and a second force field producing means located on the other side of said recording medium from said first means for producing a confined force field.

5. A recording apparatus as set forth in claim 1 wherein said second means for producing a second confined force field is arranged to produce a plurality of separate adjacent force fields and said second means for selectively energizing is arranged to selectively energize a second means for producing to produce selected ones of said plurality of adjacent force fields.

6. A recording apparatus as set forth in claim 1 wherein said second means for producing a second confined force field includes a permanent magnet having a predetermined first pole adjacent to said recording medium and a second pole remote from said recording medium and said second means for selectively actuating includes a galvanometer movement connected to said permanent magnet to suspend said permanent magnet adjacent to said recording medium.

7. A recording apparatus as set forth in claim 5 wherein said second means for producing is arranged to produce each of said plurality of separate adjacent force fields in a first and a second direction with respect to said recording medium and said second means for selectively actuating includes means for selecting said first and second direction.

8. A recording apparatus as set forth in claim 7 wherein said second means for producing includes a plurality of separate force field producing elements arranged in a matrix of adjacent elements with each of said elements being separately energized by said means for selecting.

9. A recording apparatus as set forth in claim 8 wherein said second confined force field is a magnetic field and each of said elements includes a magnetic core means and a solenoid means mounted on said core means and said means for selecting includes means for selectively applying a current to said solenoid means of each of said elements in a first and a second direction.

10. A recording apparatus as set forth in claim 9 wherein said first confined force field is a magnetic field.

* * * * *